No. 857,473. PATENTED JUNE 18, 1907.
Z. S. LAWRENCE.
STORAGE AND COOLING VAT FOR MILK OR CREAM.
APPLICATION FILED NOV. 14, 1906.
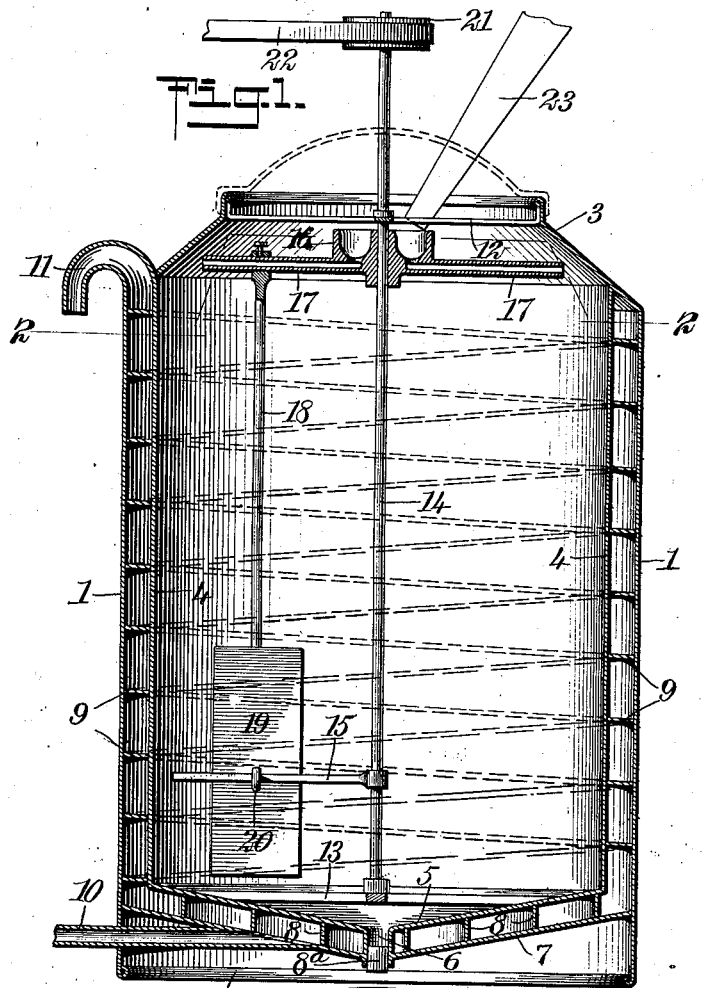
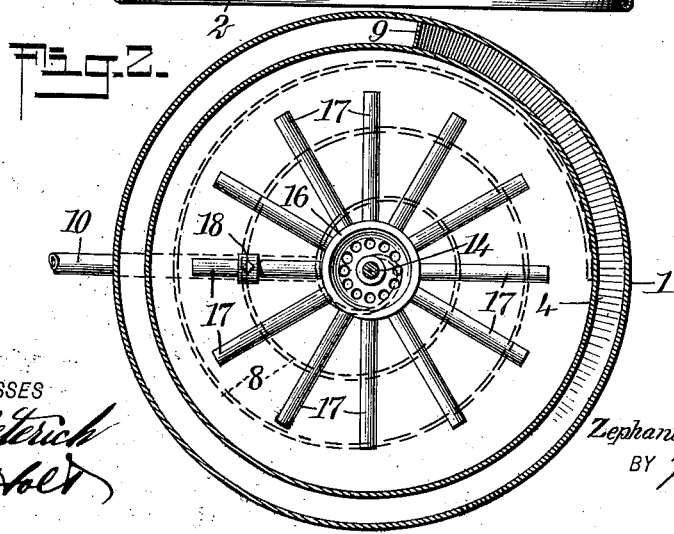
WITNESSES
INVENTOR
Zephaniah S. Lawrence
BY
ATTORNEYS

UNITED STATES PATENT OFFICE.

ZEPHANIAH SANFORD LAWRENCE, OF WEST SHEFFORD, QUEBEC, CANADA.

STORAGE AND COOLING VAT FOR MILK OR CREAM.

No. 857,473.  Specification of Letters Patent.  Patented June 18, 1907.

Application filed November 14, 1906. Serial No. 343,331.

*To all whom it may concern:*

Be it known that I, ZEPHANIAH SANFORD LAWRENCE, a subject of the King of Great Britain, and a resident of West Shefford, in the Province of Quebec and Dominion of Canada, have invented a new and Improved Storage and Cooling Vat for Milk or Cream, of which the following is a full, clear, and exact description.

This invention is an improved storage and cooling vat for milk or cream, preferably of large capacity and of such construction that the milk or cream contained therein may be subjected to a slow or gradual cooling or be suddenly chilled, as desired; also providing for a thorough mixing of the contents of the vat, bringing the same to a uniform consistency before drawing it off.

To this end one embodiment of the invention consists of an upright, cylindrical vat constructed of sheet metal and having an outer and an inner wall with a spiral passage therebetween through which a cooling medium is adapted to be passed. A shaft concentrically journaled in the vat is operable to drive a paddle adjustably fixed thereto, and also carries a series of radiating, discharging pipes for delivering and distributing the milk or cream in the vat adjacent to the inner cooling wall. This delivery is enforced through the pipes by the action of the centrifugal force as the pipes revolve.

Reference is to be had to the accompanying drawings forming a part of this specification, in which similar characters of reference indicate corresponding parts in all the figures.

Figure 1 is a central, vertical, sectional view through the preferred form of my invention, and Fig. 2 is a transverse, sectional view of the same substantially on the line 2—2 of Fig. 1.

The vat comprises an outer, cylindrical casing or wall 1, preferably of sheet metal, with an inwardly beaded lower open end 2 and a conical upper end 3 also inwardly beaded, providing the vat with a contracted mouth, which in practice will be inclosed by a suitable cover, as represented in dotted outline in Fig. 1. Extending from the conical upper end 3 of the wall 1 is a concentric, inner wall 4 having a concave bottom 5, with a suitable orifice 6 at its center, said orifice passing through a similar outer bottom 7 joined to the wall 1, and is normally closed by a plug 8ª or other convenient cut-off.

Between the double bottom 5 and 7 is spirally arranged a wall 8 forming a spiral passage communicating at its periphery with a spiral passage formed by the wall 9 intermediate the outer and inner walls 1 and 4 of the vat, respectively. Leading to the spiral passage between the double bottom of the vat at its center, is a pipe 10 for the purpose of conducting spring, well water, or other cooling medium to said spiral passages, which discharge it through an overflow pipe 11 connecting with the upper passage between the walls 1 and 4. It is apparent from this construction that the cooling medium, on entering the pipe 10, will be caused to travel spirally through the base of the vat, as also between the side walls before being discharged, thereby affording time for the walls of the vat to approach the temperature of the cooling medium before the latter is ejected.

Journaled in crossbars 12 and 13, respectively arranged at the top and bottom of the vat, is a central shaft 14, having a radial arm 15 fixed near its lower end. Also fixed to the shaft adjacent to the crossbar 12 is a cup 16 having a perforated bottom, each perforation communicating with one of a series of radiating pipes 17, preferably formed integral with the cup.

Adjustably suspended from one of the pipes 17 is a rod 18 adapted to be held in fixed position by the set-screw shown, and carrying at its lower end a paddle 19 provided at one face with an eye 20 which is engaged by the arm 15, causing the paddle to revolve as the shaft 14 is rotated. For rotating the shaft a pulley 21 is fixed to its upper extremity, which is driven by a belt 22 from any suitable source of power.

In the operation of the vat, the milk or cream is conducted through its upper end by a pipe or trough 23 discharging into the cup 16, which feeds it through the radiating pipes 17, discharging and distributing the milk or cream adjacent to the inner cooled wall of the vat. This distribution is intensified when the shaft 14 is revolved, due to the action of the centrifugal force and further acting to bring the milk or cream to a sudden chill, due to the motion set up in the same by reason of the movement of the paddle 19. The velocity of this motion is controlled by adjusting the paddle radially of the vat inwardly or outwardly as less or greater velocity of the contents of the vat are desired.

When the contents of the vat are to be discharged, a few revolutions of the shaft 14 and paddle 19 will bring the milk or cream to a uniform consistency, after which the plug 8ª is withdrawn. This plug is also removed for cleansing the vat, which is preferably accomplished by causing a stream of hot water to play through its upper end.

I have described the invention in detail in order that the construction and operation might be fully understood. I, however, regard the precise embodiment as not materali so long as the essential characteristics are employed as pointed out in the annexed claims.

Having thus described my invention I claim as new and desire to secure by Letters Patent:

1. A vat for milk or cream, having a shaft journaled centrally therein, a cup fixed to the shaft and having a perforated bottom, and a series of radial discharge pipes leading from the perforations.

2. A vat for milk or cream, having a shaft journaled therein, a series of radiating pipes fixed to the shaft, for receiving the milk and cream and discharging it into the vat, a paddle suspended from one of said pipes, and means for revolving the shaft, whereby the paddle sets the milk or cream in motion.

3. A vat for milk or cream, having a double wall between which a cooling medium is adapted to be passed, a shaft journaled centrally in the vat, and a series of radiating pipes fixed to the shaft, for receiving and discharging the milk or cream into the vat.

4. A vat for milk or cream, having a double wall with a spiral passage therebetween through which a cooling medium is adapted to be passed, a shaft journaled centrally in the vat, a series or radiating pipes carried by the shaft, for receiving and discharging the milk or cream adjacent to the inner wall of the vat, and means operated by said shaft for enforcing the circulation of the milk or cream in the vat.

5. A vat for milk or cream, having a shaft journaled centrally therein, a cup provided with a series of radiating pipes fixed to said shaft near the top of the vat, an arm fixed to the shaft near the bottom of the vat, and a paddle adjustably suspended from one of said pipes and engaged by said arm, for the purpose described.

6. A vat for milk or cream, having a double, concave bottom and sides with a spiral passage therebetween, and revoluble means in the vat for discharging the milk or cream adjacent to the inner wall of the vat, said double, concave bottom having an orifice at its center for withdrawing the contents of the vat.

In testimony whereof I have signed my name to this specification in the presence of two subscribing witnesses.

ZEPHANIAH SANFORD LAWRENCE.

Witnesses:
CARL H. WELCH,
GEORGE CONNONS.